(12) United States Patent
Yoon et al.

(10) Patent No.: US 9,652,999 B2
(45) Date of Patent: May 16, 2017

(54) COMPUTER-IMPLEMENTED SYSTEMS AND METHODS FOR ESTIMATING WORD ACCURACY FOR AUTOMATIC SPEECH RECOGNITION

(75) Inventors: Su-Youn Yoon, Lawrenceville, NJ (US); Lei Chen, Pennington, NJ (US); Klaus Zechner, Princeton, NJ (US)

(73) Assignee: Educational Testing Service, Princeton, NJ (US)

( * ) Notice: Subject to any disclaimer, the term of this patent is extended or adjusted under 35 U.S.C. 154(b) by 1084 days.

(21) Appl. No.: 13/095,980

(22) Filed: Apr. 28, 2011

(65) Prior Publication Data

US 2011/0270612 A1 Nov. 3, 2011

Related U.S. Application Data

(60) Provisional application No. 61/329,151, filed on Apr. 29, 2010.

(51) Int. Cl.
| | |
|---|---|
| *G10L 15/26* | (2006.01) |
| *G10L 15/32* | (2013.01) |
| *G09B 19/04* | (2006.01) |
| *G09B 19/06* | (2006.01) |

(52) U.S. Cl.
CPC .............. *G09B 19/06* (2013.01); *G10L 15/26* (2013.01); *G09B 19/04* (2013.01); *G10L 15/32* (2013.01)

(58) Field of Classification Search
CPC ......... G10L 15/08; G10L 15/10; G10L 25/48; G10L 15/26; G10L 15/32; G09B 19/06; G09B 19/04
USPC .......... 704/251, 252, 270; 434/156–157, 185
See application file for complete search history.

(56) References Cited

U.S. PATENT DOCUMENTS

| | | | | |
|---|---|---|---|---|
| 6,405,170 | B1 * | 6/2002 | Phillips | G10L 15/22 |
| | | | | 379/88.02 |
| 8,036,893 | B2 * | 10/2011 | Reich | 704/257 |
| 2001/0041977 | A1 * | 11/2001 | Aoyagi et al. | 704/246 |
| 2003/0216912 | A1 * | 11/2003 | Chino | 704/231 |

(Continued)

OTHER PUBLICATIONS

Vemuri, Sunil, et al. "Improving speech playback using time-compression and speech recognition." Proceedings of the SIGCHI conference on Human factors in computing systems. ACM, Apr. 2004, pp. 1-9.*

(Continued)

*Primary Examiner* — James Wozniak
(74) *Attorney, Agent, or Firm* — Jones Day

(57) ABSTRACT

Systems and methods are provided for scoring non-native, spontaneous speech. A spontaneous speech sample is received, where the sample is of spontaneous speech spoken by a non-native speaker. Automatic speech recognition is performed on the sample using an automatic speech recognition system to generate a transcript of the sample, where a speech recognizer metric is determined by the automatic speech recognition system. A word accuracy rate estimate is determined for the transcript of the sample generated by the automatic speech recognition system based on the speech recognizer metric. The spontaneous speech sample is scored using a preferred scoring model when the word accuracy rate estimate satisfies a threshold, and the spontaneous speech sample is scored using an alternate scoring model when the word accuracy rate estimate fails to satisfy the threshold.

19 Claims, 9 Drawing Sheets

(56) References Cited

U.S. PATENT DOCUMENTS

| | | | |
|---|---|---|---|
| 2005/0102135 A1* | 5/2005 | Goronzy et al. | 704/213 |
| 2006/0020463 A1* | 1/2006 | Reich | 704/257 |
| 2006/0053014 A1* | 3/2006 | Yoshizawa | 704/256.4 |
| 2006/0074898 A1* | 4/2006 | Gavalda et al. | 707/4 |
| 2006/0110712 A1* | 5/2006 | Julia et al. | 434/156 |
| 2006/0111902 A1* | 5/2006 | Julia et al. | 704/236 |
| 2006/0116876 A1* | 6/2006 | Marcus | 704/231 |
| 2007/0048697 A1* | 3/2007 | Du et al. | 434/156 |
| 2007/0192095 A1* | 8/2007 | Braho | G10L 15/01 704/232 |
| 2007/0192101 A1* | 8/2007 | Braho | G10L 15/065 704/251 |
| 2007/0219776 A1* | 9/2007 | Gamon et al. | 704/9 |
| 2007/0219798 A1* | 9/2007 | Wang | G10L 15/063 704/257 |
| 2008/0177534 A1* | 7/2008 | Wang | H04M 3/002 704/211 |
| 2008/0270110 A1* | 10/2008 | Yurick et al. | 704/3 |
| 2008/0294440 A1* | 11/2008 | Higgins et al. | 704/251 |
| 2009/0119105 A1* | 5/2009 | Kim et al. | 704/244 |
| 2009/0171661 A1* | 7/2009 | Jayadeva | G09B 19/04 704/250 |
| 2009/0204398 A1* | 8/2009 | Du et al. | 704/231 |
| 2010/0145698 A1* | 6/2010 | Chen et al. | 704/256.1 |
| 2010/0312556 A1* | 12/2010 | Ljolje et al. | 704/244 |
| 2011/0257961 A1* | 10/2011 | Tinkler et al. | 704/9 |
| 2011/0320203 A1* | 12/2011 | Reich | 704/254 |
| 2012/0290300 A1* | 11/2012 | Lee | G09B 19/06 704/235 |
| 2013/0080150 A1* | 3/2013 | Levit | G06F 17/273 704/9 |
| 2013/0132089 A1* | 5/2013 | Fanty | G10L 21/00 704/270 |
| 2013/0158982 A1* | 6/2013 | Zechner | G06F 17/28 704/9 |

OTHER PUBLICATIONS

Chase, Lin; Word and Acoustic Confidence Annotation for Large Vocabulary Speech Recognition; in Proceedings of the European Conference on Speech Communication and Technology; pp. 815-818; 1997.

Cucchiarini, Catia, Strik, Helmer, Boves, Lou; Quantitative Assessment of Second Language Learners' Fluency: Comparisons Between Read and Spontaneous Speech; Journal of the Acoustical Society of America, 111(6); pp. 2862-2873; 2002.

Fish, Randall, Hu, Qian, Boykin, Stanley; Using Audio Quality to Predict Word Error Rate in an Automatic Speech Recognition System; MITRE Corporation, Technical Paper; 2006.

Gabsdil, Malte; Lemon, Oliver; Combining Acoustic and Pragmatic Features to Predict Recognition Performance in Spoken Dialogue Systems; Proceedings of ACL; pp. 344-351; 2004.

Goldwater, Sharon, Jurafsky, Dan, Manning, Christopher; Which Words Are Hard to Recognize? Prosodic, Lexical, and Disfluency Factors That Increase ASR Error Rates; Speech Communication; pp. 181-200; 2010.

Hall, Mark, Frank, Eibe, Holmes, Geoffrey, Pfahringer, Bernhard, Reutemann, Peter, Witten, Ian; The WEKA Data Mining Software: An Update; in SIGKDD Explorations, 11(1); 2009.

Hazen, Timothy, Seneff, Stephanie, Polifroni, Joseph; Recognition Confidence Scoring and Its Use in Speech Understanding Systems; Computer Speech and Language, 16; pp. 49-67; 2002.

Lennon, Paul; Investigating Fluency in EFL: A Quantitative Approach; Language Learning, 40(3); pp. 387-417; 1990.

Litman, Diane, Hirshberg, Julia, Swerts, Marc; Predicting Automatic Speech Recognition Performance Using Prosodic Cues; Proceedings of the 6th International Conference of Spoken Language Processing; 2000.

Neti, Chalapathy, Roukos, Salim, Eide, E.; Word-Based Confidence Measures as a Guide for Stack Search in Speech Recognition; Proceedings of the 1997 IEEE International Conference on Acoustics, Speech, and Signal Processing; IEEE Computer Society; pp. 883-886; 1997.

NIST; The NIST SPeech Quality Assurance (SPQA) Package Version 2.3; 2009.

Salton, Gerard (Ed.); The SMART Retrieval System: Experiments in Automatic Document Processing; Prentice-Hall, New Jersey; 1971.

Walker, Marilyn, Wright, Jerry, Langkilde, Irene; Using Natural Language Processing and Discourse Features to Identify Understanding Errors in a Spoken Dialogue System; Proceedings of the 17th International Conference on Machine Learning; pp. 1111-1118; 2000.

Zechner, Klaus, Higgins, Derrick, Xi, Xiaoming, Williamson, David; Automatic Scoring of Non-Native Spontaneous Speech in Tests of Spoken English; Speech Communication; 2009.

* cited by examiner

| FEATURE CATEGORY | | FEATURE NAME | CORR. | MODEL |
|---|---|---|---|---|
| SPEECH RECOGNIZER METRICS | INTERNAL SPEECH RECOGNIZER METRICS | MEAN ACOUSTIC MODEL SCORE | -0.34 | 8 |
| | | MEAN NORMALIZED CONFIDENCE SCORE | 0.64 | 1 |
| | | PROPORTION OF LOW CONFIDENCE SCORES | -0.50 | 6 |
| | | CONFIDENCE SCORE PER SECOND | 0.58 | 7 |
| | SPEECH RECOGNIZER OUTPUT METRICS | WORD PER SECOND | 0.37 | 2 |
| | | MEAN LONG SILENCE DURATION | 0.11 | 3 |
| | | STANDARD DEVIATION OF LONG SILENCE DURATION | 0.10 | 11 |
| | | SILENCES PER SECOND | 0.11 | 9 |
| | | FREQUENCY OF DISFLUENCY | -0.12 | 4 |
| | | FUNCTION WORD FREQUENCY | -0.22 | 10 |
| | | FUNCTION WORD PROPORTION | -0.23 | 12 |
| ACOUSTIC METRICS | | STANDARD DEVIATION OF PITCH NORMALIZED BY SPEAKER | 0.13 | 5 |

Fig. 6

COMPUTER-IMPLEMENTED SYSTEMS AND METHODS FOR ESTIMATING WORD ACCURACY FOR AUTOMATIC SPEECH RECOGNITION

CROSS REFERENCE TO RELATED APPLICATIONS

This application claims priority to U.S. Provisional Application No. 61/329,151, filed Apr. 29, 2010, entitled "Predicting Word Accuracy for Automatic Speech Recognition of Non-Native Speech," the entirety of which is herein incorporated by reference.

FIELD

The technology described herein relates generally to constructed response scoring and more particularly to automated scoring of a constructed response.

BACKGROUND

The education community is continually moving towards using constructed or free-text responses to examine test taker abilities. The community is also moving towards widespread use of computerized scoring of assessments. While computers are especially apt at scoring certain types of tests (e.g., multiple choice tests that require selection of one of a discrete number of proposed answers), tests that request constructed responses (e.g., essay responses) are more difficult for a computer to score based on their open ended nature. These difficulties are further exacerbated when automatic scoring is applied to a spoken constructed response, as opposed to a written response.

SUMMARY

Systems and methods are provided for scoring non-native, spontaneous speech. A spontaneous speech sample is received, where the sample is of spontaneous speech spoken by a non-native speaker. Automatic speech recognition may be performed on the sample using an automatic speech recognition system to generate a transcript of the sample, where a speech recognizer metric is determined by the automatic speech recognition system. A word accuracy rate estimate may be determined for the transcript of the sample generated by the automatic speech recognition system based on the speech recognizer metric. The spontaneous speech sample may be scored using a preferred scoring model when the word accuracy rate estimate satisfies a threshold, and the spontaneous speech sample may be scored using an alternate scoring model when the word accuracy rate estimate fails to satisfy the threshold.

BRIEF DESCRIPTION OF THE DRAWINGS

FIG. 6 is a chart listing certain features that may be used by a word accuracy rate calculator to generate a word accuracy rate.

DETAILED DESCRIPTION

Figure 1:
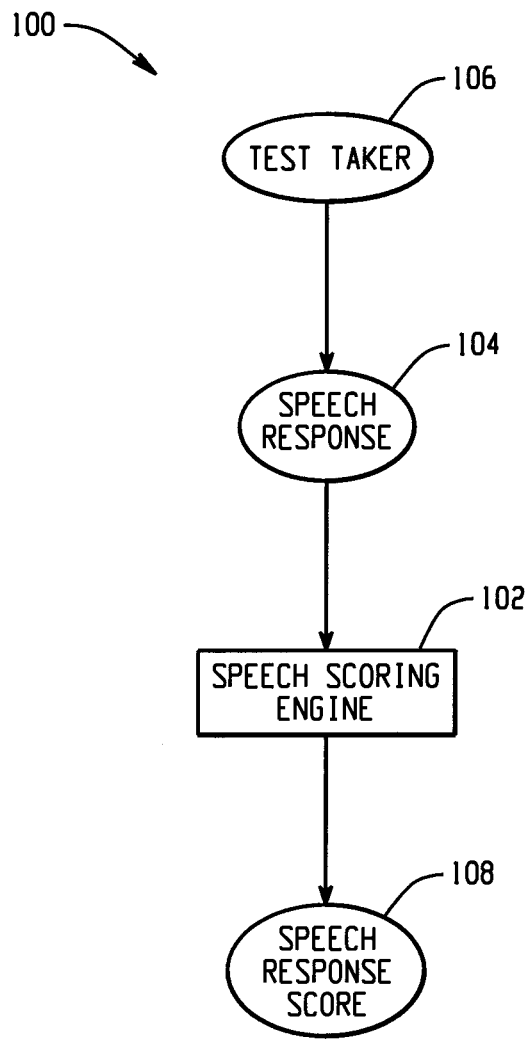
FIG. 1 is a block diagram depicting an example speech scoring engine.

FIG. 1 is a block diagram depicting an example speech scoring engine. The speech scoring engine 102 receives a speech response 104 provided by a test taker 106. For example, the speech response 104 may be provided by the test taker 106 as part of an examination in response to a prompt. The examination may seek to provide an assessment of the test taker's ability to speak English. The examination may seek to assess that ability by asking the test taker 106 one or more open ended questions that allow the test taker 106 to respond via a spoken, constructed (e.g., essay) response. For example, the test taker 106 may be asked to discuss the test taker's commute to the test taking site on the day of the examination (e.g., "How was your drive to the test taking center this morning?"). The speech scoring engine 102 analyzes the test taker's response 104 and provides a speech response score 108 in response to that analysis.

The assessment of test taker's English speaking ability can be based on a variety of speech response metrics. For example, the speech response 104 may be scored based upon pitch, tone, speaking rate, length of pauses and other discontinuities, and other non-content related metrics. The speech response 104 may also be scored based upon certain content related metrics, such as whether the speech response 104 is on topic, whether the speech response 104 contains certain concepts, whether the speech response 104 uses proper grammar, and the diversity of vocabulary used in the speech response 104.

Figure 2:
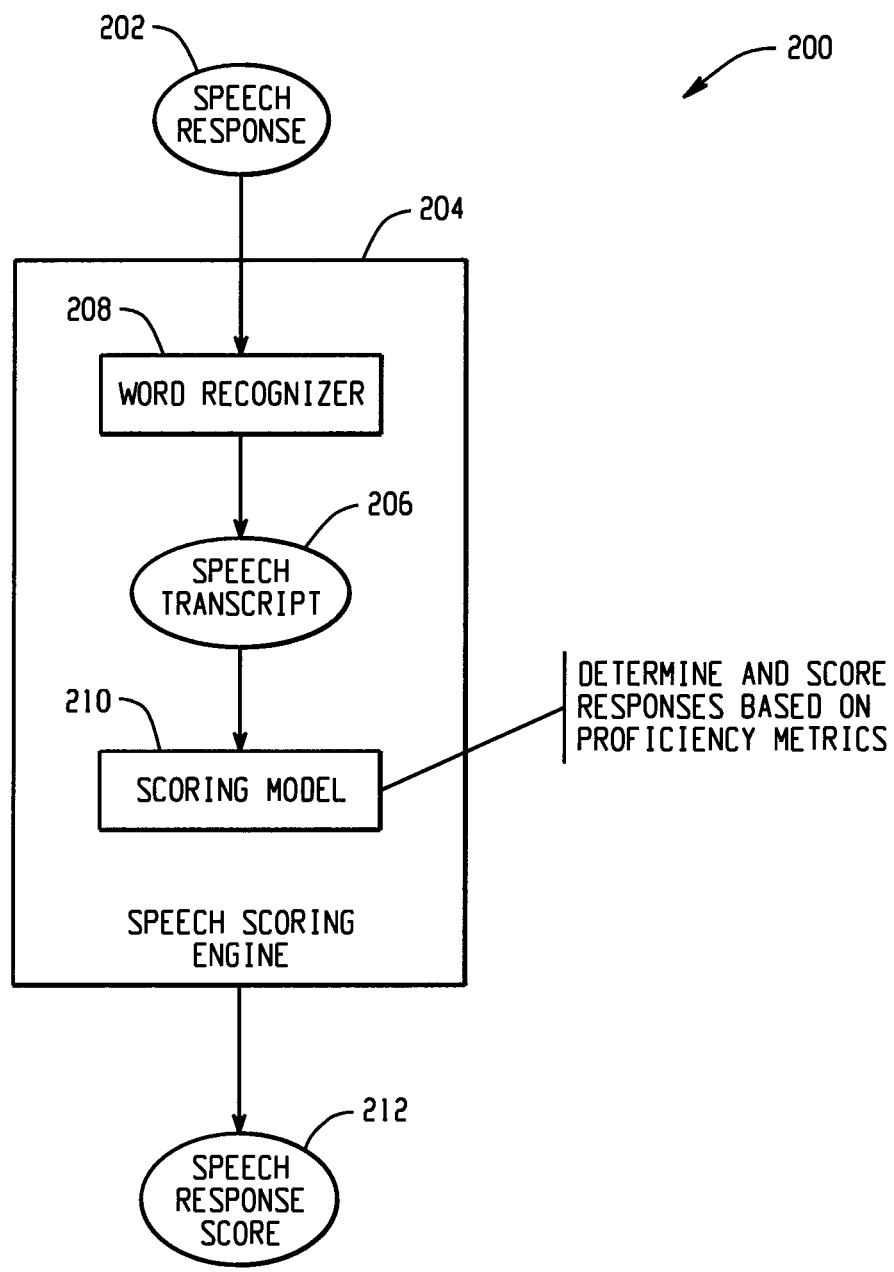
FIG. 2 is a block diagram depicting a speech scoring engine that includes a word recognizer.

FIG. 2 is a block diagram depicting a speech scoring engine that includes a word recognizer. Many non-content related metrics can be ascertained without knowing what words were spoken in the speech response 202. However, certain content related metrics may require that the speech scoring engine 204 have a transcript 206 of the speech response 202. The speech scoring engine 204 may utilize a word recognizer 208 to generate a transcript 206 of the speech response 202 to facilitate determination of different metrics related to the speech response. Those metrics may be utilized by a scoring model 210 to generate a speech response score 212.

Figure 3:
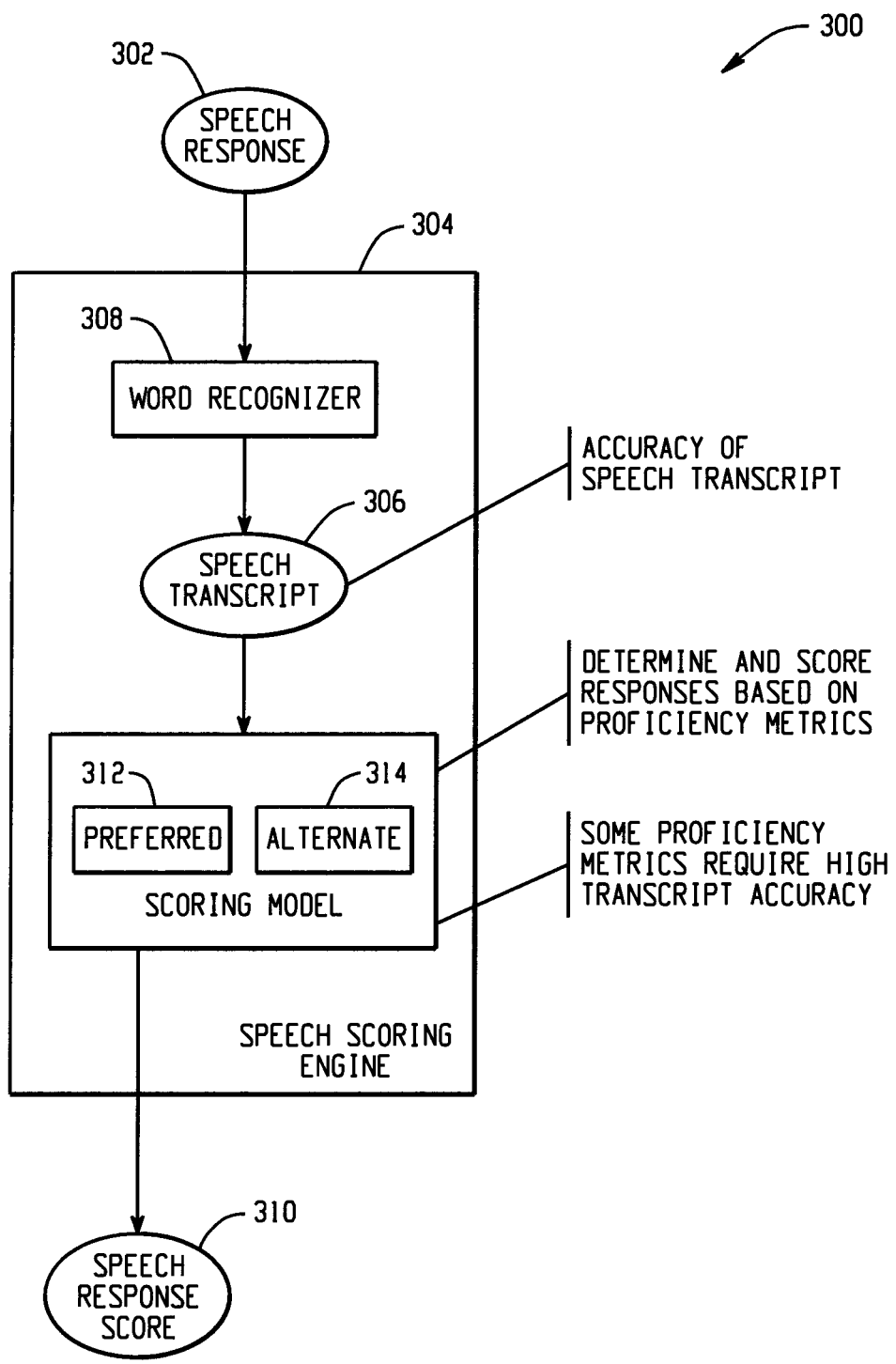
FIG. 3 is a block diagram depicting a speech scoring engine that requires a certain level of transcript accuracy to determine certain metrics.

To accurately determine values for certain metrics, such as many content related metrics, a speech scoring engine may require a sufficient level of transcript accuracy. FIG. 3 is a block diagram depicting a speech scoring engine that requires a certain level of transcript accuracy to determine certain metrics. For example, a speech scoring engine 304 may need a transcript 306 having a sufficient level of accuracy to determine whether the speech response 302 utilizes proper grammar. If the transcript does not meet the required accuracy level, then the speech scoring engine 304 may not be able to provide a meaningful grammar metric score.

To avoid providing erroneous or meaningless values for content related metrics, a speech scoring engine 304 may utilize a word accuracy rate calculator to estimate the accuracy level of a transcript 306 generated by a word recognizer 308. If the transcript accuracy is high, then the speech scoring engine 304 may use the content related metrics in generating a speech response score 310, such as by using a preferred scoring model 312. If the transcript accuracy is not sufficiently high to enable a quality content related metric calculation, then a reduced or different number of metrics (e.g., fewer content related metrics, only non-content related metrics) may be used to generate a speech response score 310, such as by using an alternate scoring model 314.

Figure 4:
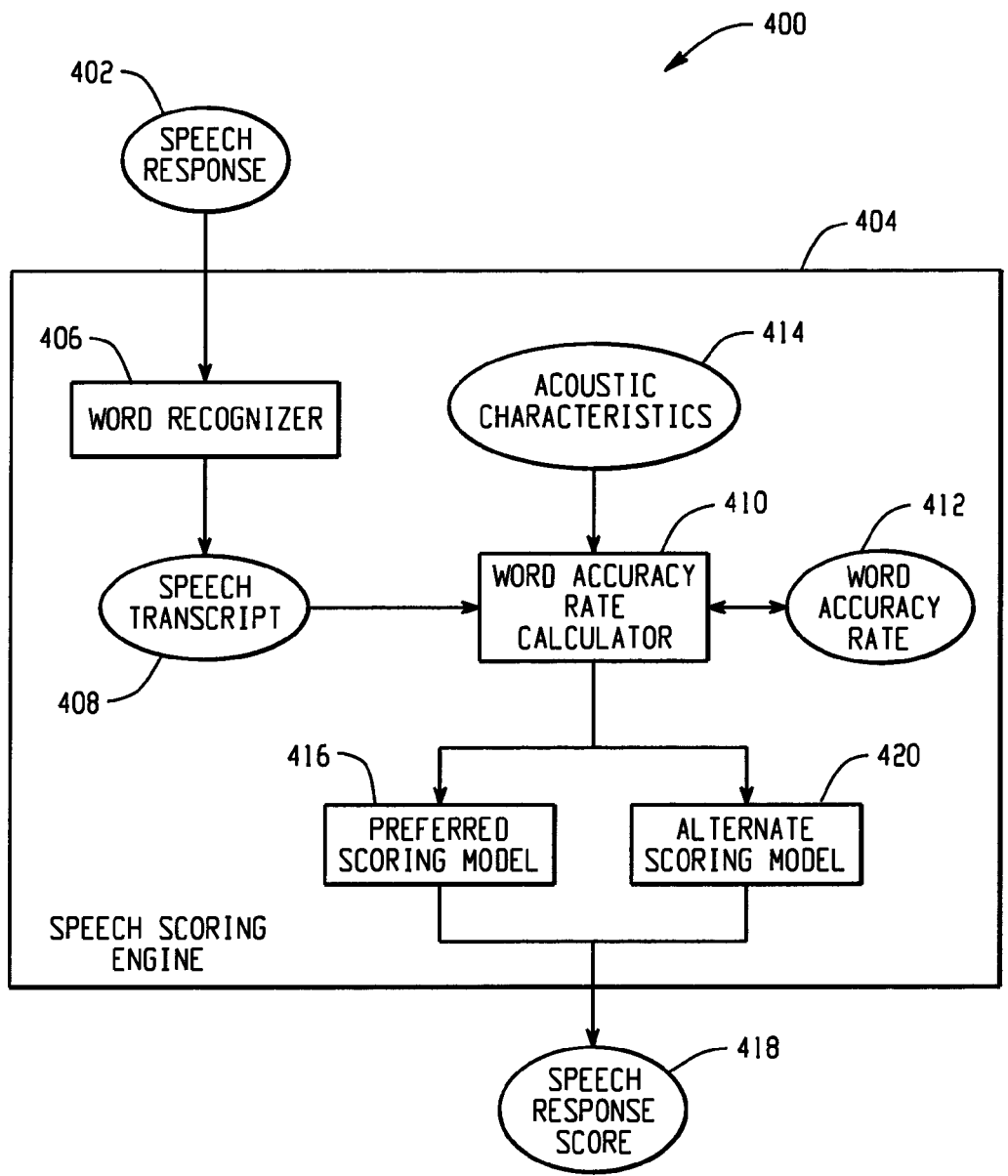
FIG. 4 is a block diagram depicting the calculation of a word accuracy rate for selecting between a preferred scoring model and an alternate scoring model.

FIG. 4 is a block diagram depicting the calculation of a word accuracy rate for selecting between a preferred scoring model and an alternate scoring model. A speech response 402 is received by a speech scoring engine 404 and is processed by a word recognizer 406 to generate a speech transcript 408. The speech transcript 408 is analyzed by a word accuracy rate calculator 410 to generate an estimate of the word accuracy rate 412 of the speech transcript 408. The word accuracy rate calculator 410 may consider other factors such as certain acoustic characteristics 414 of the speech response 402 in generating a word accuracy rate estimate 412. The word accuracy rate estimate 412 is compared to a threshold. If the word accuracy rate estimate 412 satisfies a threshold, then a preferred scoring model 416 is used to generate a speech response score 418. If the word accuracy rate estimate 412 fails to satisfy the threshold, then an alternate scoring model 420 is used to generate the speech response score 418.

Figure 5:
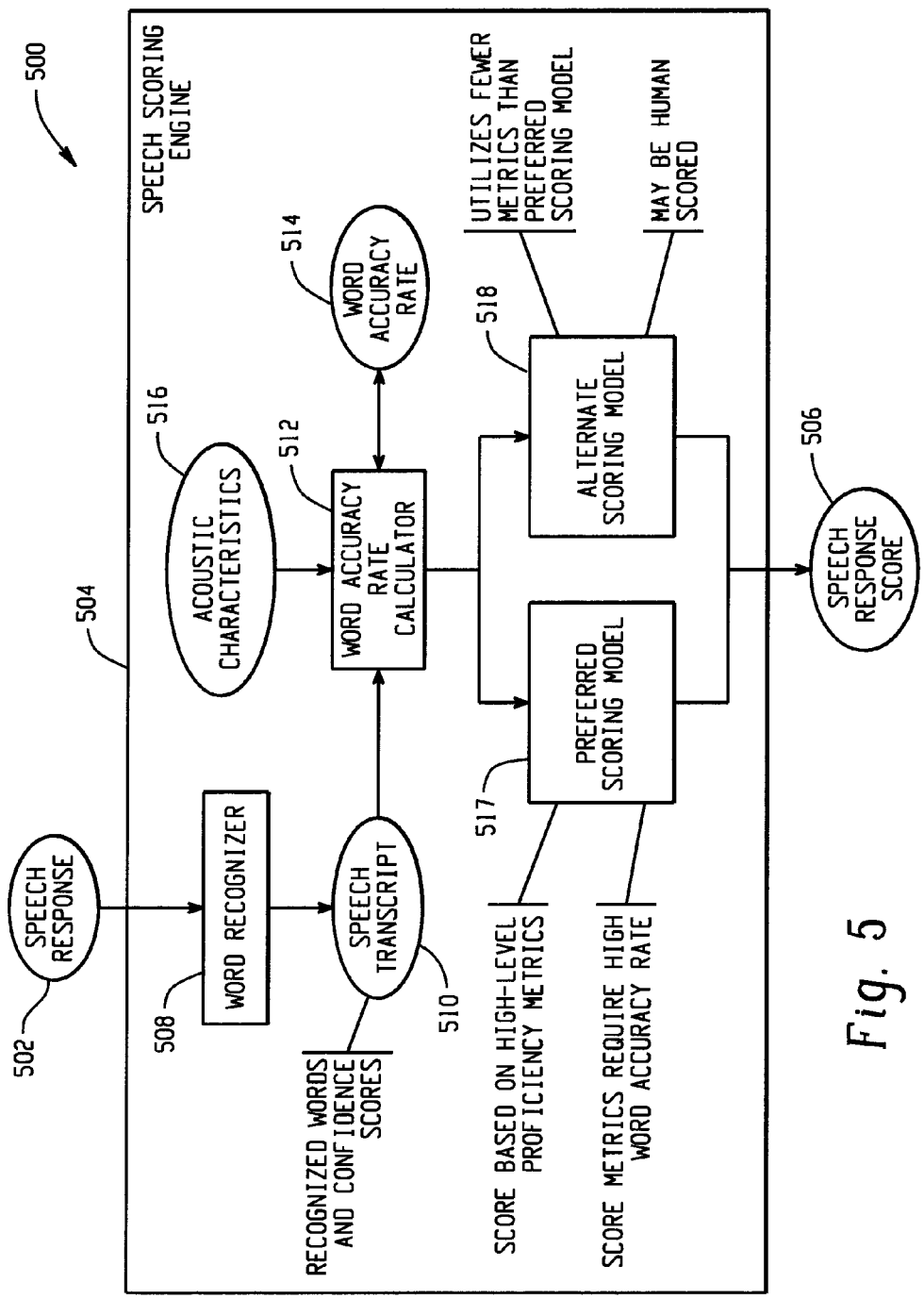
FIG. 5 is a block diagram depicting the calculation of a word accuracy rate using a speech transcript and acoustic characteristics.

FIG. 5 is a block diagram depicting the calculation of a word accuracy rate using a speech transcript and acoustic characteristics. A speech response 502 is received by a speech scoring engine 504, which analyzes the speech response 502 to generate a speech response score 506. A word recognizer 508 generates a speech transcript 510. The word recognizer 508 may include an automatic speech recognition engine that produces the speech transcript as well as certain speech recognizer metrics that may be used by the word accuracy calculator 512 to generate the word accuracy rate estimate 514.

The speech recognizer metrics provided to the word accuracy rate calculator 512 may be internal speech recognizer metrics or speech recognizer output metrics. For example, a speech recognizer metric may be an internal speech recognizer metric that is based on a quality of the automatic speech recognition in the form of one or more confidence scores (e.g., confidence scores for each word, average confidence scores for multiple words of the speech response). A confidence score may be determined for each word of the speech sample 502 during the automatic speech recognition, where the speech recognizer metric is calculated based on those confidence scores. The internal speech recognizer metric may be presented to the word accuracy rate calculator 512 in a variety of forms, such as a mean normalized confidence score, a proportion of low confidence scores, and a confidence score per second.

As another example, a speech recognizer output metric used in determining a word accuracy rate estimate may be an output metric that includes hypothesized words and time stamps associated with the speech response 502. For example, the speech recognizer metric may be based on a speaking rate, silence related metrics, a mean long silence duration, a standardized long silence duration, silences per second, a disfluency related metric, or a frequency of disfluencies.

The word accuracy rate calculator 512 may also consider certain acoustic characteristics 516 in generating a word accuracy rate estimate 514. For example, the word accuracy rate calculator 512 may consider acoustic characteristics 516 such as pitch, power, and a signal to noise ratio of a speech response.

Certain metrics from the word recognizer 508 and the collection of acoustic characteristics 516 have been found to be correlated with word accuracy rates. Thus, the word accuracy rate calculator 512 may consider those correlated metrics in calculating a word accuracy rate estimate 514. FIG. 6 is a chart listing certain features that may be used by a word accuracy rate calculator 512 to generate a word accuracy rate 514. In the example of FIG. 6, the word accuracy rate calculator 512 considers internal speech recognizer metrics that include a mean acoustic model score, a mean normalized confidence score, a proportion of low confidence scores, and a confidence score per second. The word accuracy rate calculator 512 further considers speech recognizer output metrics that include words per second, a mean long silence duration, a standard deviation of long silence duration, silences per second, a frequency of disfluency, a function word frequency, and a function word proportion. The word accuracy rate calculator 512 further considers an acoustic metric of a standard deviation of pitch normalization by the speaker.

In another example, the word accuracy rate calculator 512 considers a mean acoustic model score, a mean normalized confidence score, a proportion of low confidence scores, a confidence score per second, a function word frequency, a function word proportion, a standard deviation of pitch normalized by speaker, words per second, a mean long silence duration, a standard deviation of long silence duration, silences per second, and a frequency of disfluencies. Other metrics that may be considered include a mean language model score, mean raw confidence scores, standard deviation of confidence scores, mean power, max power, min power, max pitch, min pitch, signal to noise ratio, mean noise level, and peak speech level.

The word accuracy rate calculator 512 may be performed using a classifier built on conditional models, such as multiple regression model or support vector machine. Based on a variety of features, the word accuracy rate calculation task can be generalized as:

$$Y = f(X, \beta)$$

where Y denotes the word accuracy rate estimation 514, X denotes the corresponding features, and $\beta$ denotes a set of parameters.

Based on the word accuracy rate estimate 514, the speech scoring engine 504 determines which of the preferred scoring model 517 and the alternate scoring model 518 to utilize in calculating the speech response score 506. The preferred scoring model 517 may score speech responses based on high-level proficiency metrics that include content related metrics such as vocabulary diversity, grammatical complexity and correctness, and topical coherence. Certain of the metrics used by the preferred scoring model 517 may require a high word accuracy rate. Thus, the preferred scoring model 517 is used when the word accuracy rate estimate 514 satisfies a threshold.

The alternate scoring model 518 may be used when the word accuracy rate estimate 514 does not satisfy the threshold. The alternate scoring model 518 may utilize fewer metrics or different metrics than the preferred scoring model. In general, the alternate scoring model 518 will rely on fewer content related metrics than the preferred scoring model. The alternate scoring model 518 may also be realized by a human scorer. A human scorer may be better able to recognize the words used in a speech response 502 having a low word accuracy rate estimate 514. Thus, those low word accuracy rate estimate speech responses may be provided to a human scorer to offer the best opportunity for accurate generation of the speech response score 506.

Figure 7:
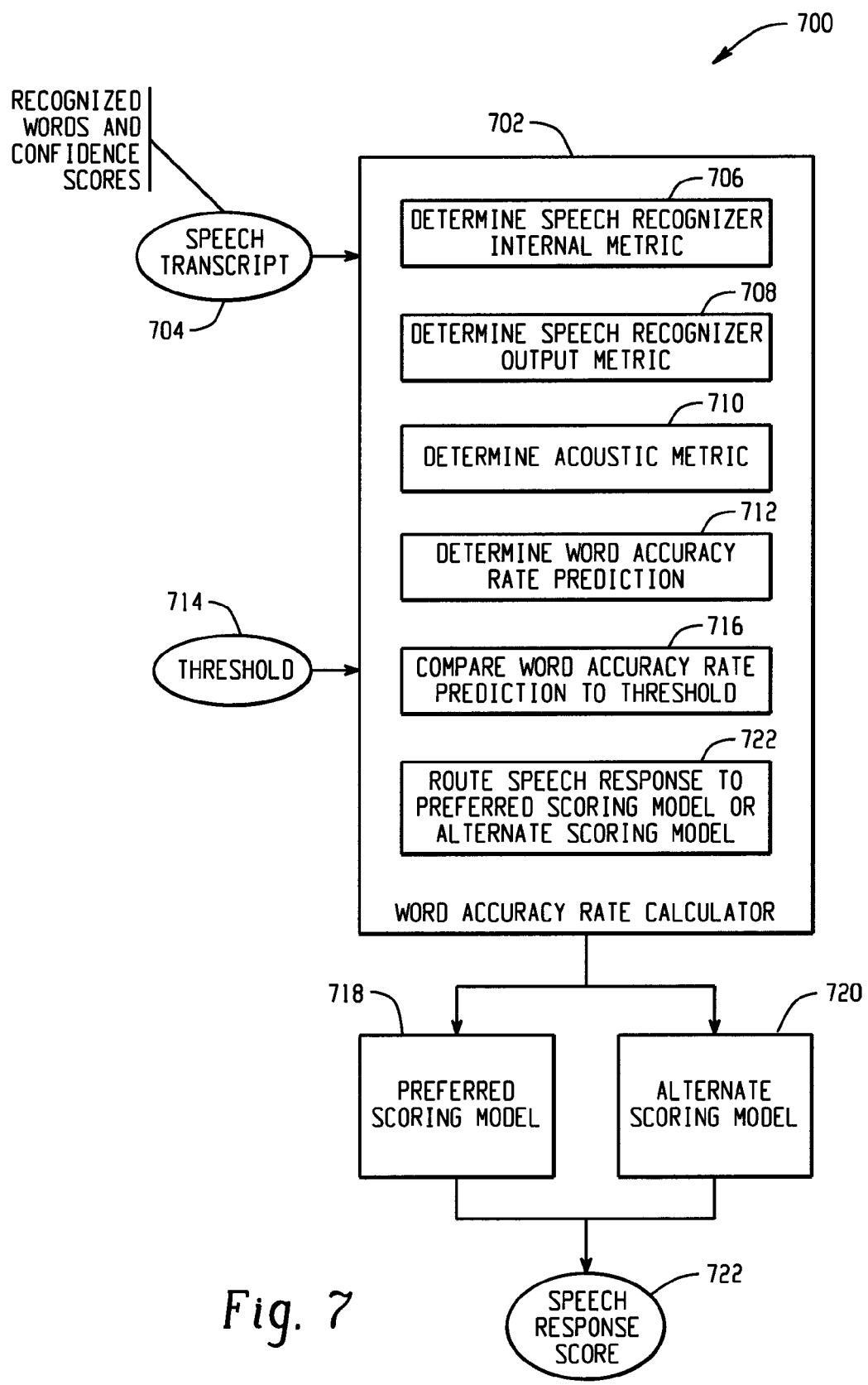
FIG. 7 is a block diagram depicting example operations that may be performed by a word accuracy rate calculator in determining a word accuracy rate estimate.

FIG. 7 is a block diagram depicting example operations that may be performed by a word accuracy rate calculator in determining a word accuracy rate estimate. The word accuracy rate calculator 702 receives a speech transcript 704 that includes recognized words and certain metrics such as confidence scores that those words were recognized correctly by a speech recognizer. The word accuracy rate calculator 702 may determine speech recognizer internal metrics at 706 that may be received from the speech recognizer. The word accuracy rate calculator 702 may also determine speech recognizer output metrics at 708 that may also be received from the speech recognizer. The word accuracy rate calculator 702 may also determine acoustic metrics at 710 based on a received speech sample. Based on received metrics, the word accuracy rate calculator 702 determines a word accuracy rate estimate for the speech transcript 704 of the sample at 712. The word accuracy rate estimate is compared to a threshold 714 at 716, and based on that comparison, the speech response is routed to either the preferred scoring model 718 or the alternate scoring model 720 to generate the speech response score 722.

Figure 8A:
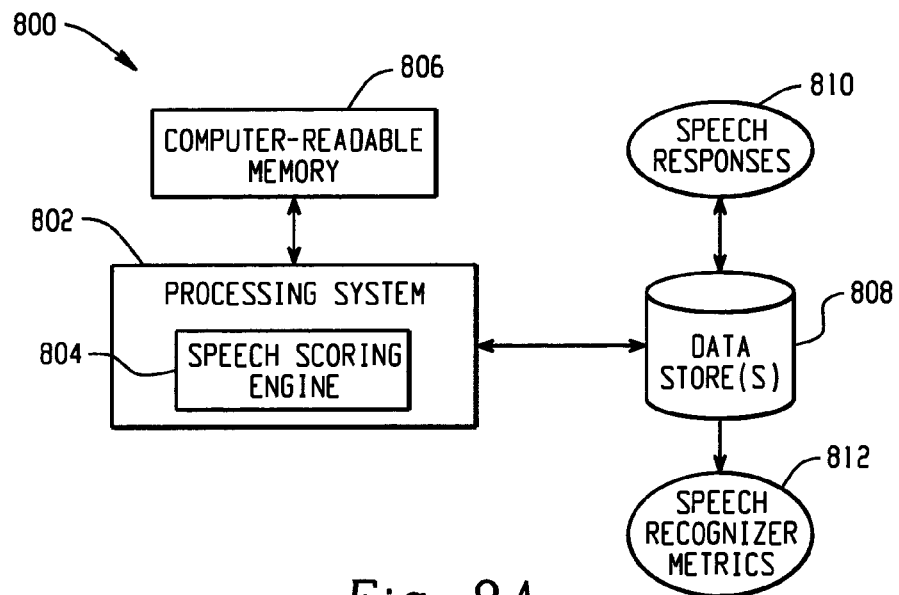
FIGS. 8A, 8B, and 8C depict example systems for use in implementing a speech scoring engine.
Figure 8B:
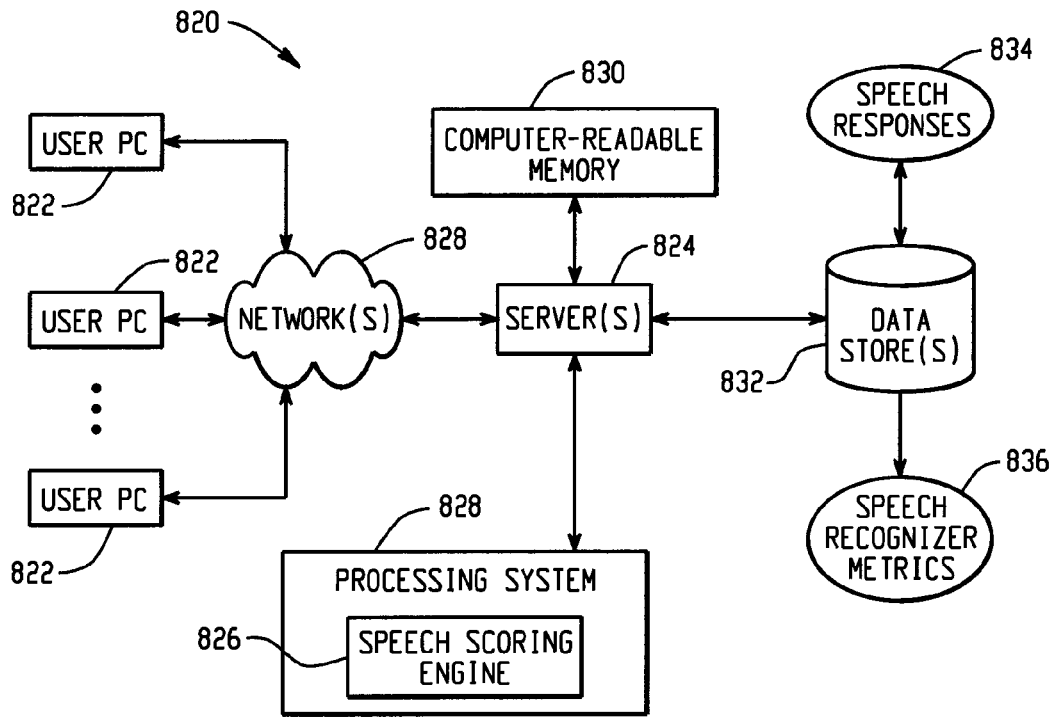
Figure 8C:
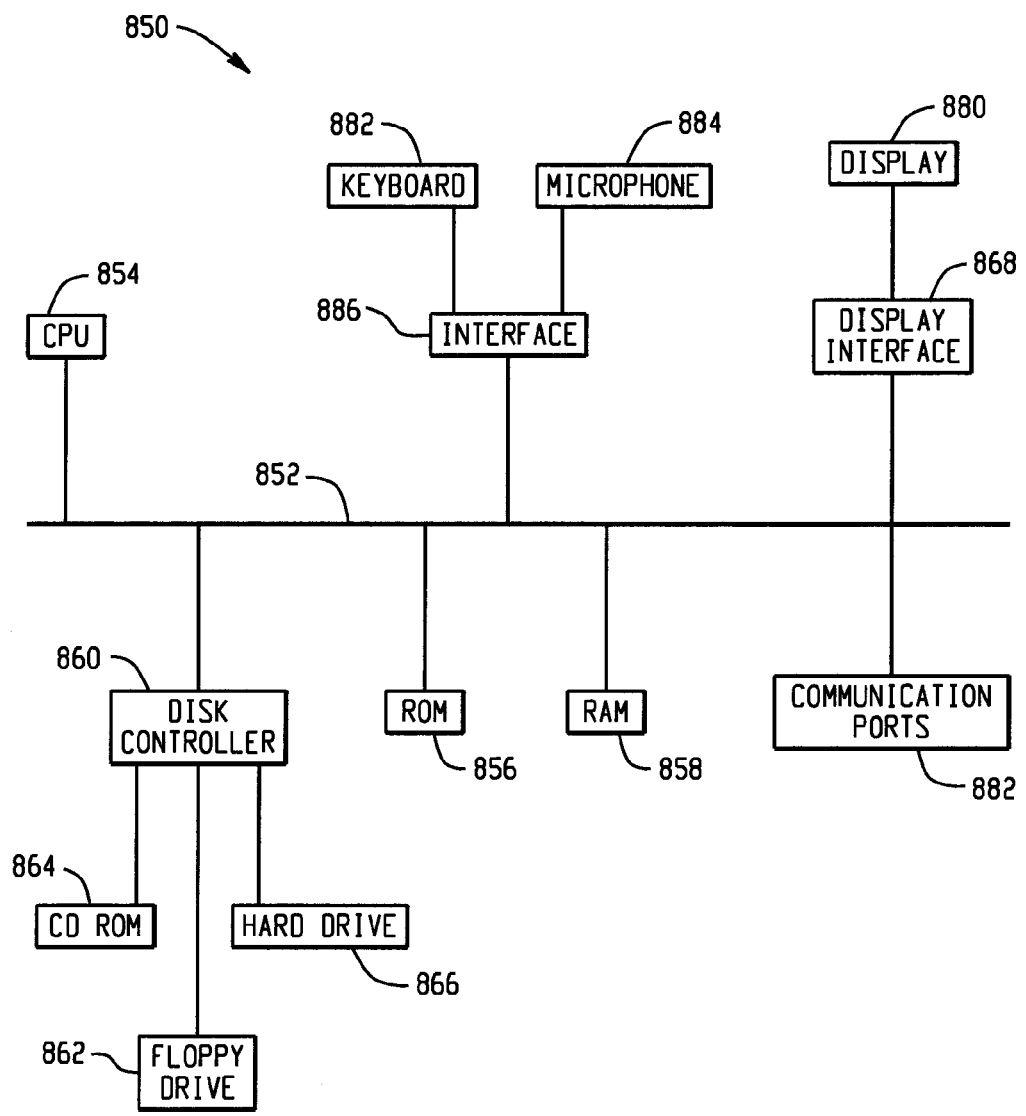

FIGS. 8A, 8B, and 8C depict example systems for use in implementing a speech scoring engine. For example, FIG. 8A depicts an exemplary system 800 that includes a stand alone computer architecture where a processing system 802 (e.g., one or more computer processors) includes a speech scoring engine 804 being executed on it. The processing system 802 has access to a computer-readable memory 806 in addition to one or more data stores 808. The one or more data stores 808 may include speech responses 810 as well as speech recognizer metrics 812.

FIG. 8B depicts a system 820 that includes a client server architecture. One or more user PCs 822 accesses one or more servers 824 running a speech scoring engine 826 on a processing system 827 via one or more networks 828. The one or more servers 824 may access a computer readable memory 830 as well as one or more data stores 832. The one or more data stores 832 may contain speech responses 834 as well as speech recognizer metrics 836.

FIG. 8C shows a block diagram of exemplary hardware for a standalone computer architecture 850, such as the architecture depicted in FIG. 8A that may be used to contain and/or implement the program instructions of system embodiments of the present invention. A bus 852 may serve as the information highway interconnecting the other illustrated components of the hardware. A processing system 854 labeled CPU (central processing unit) (e.g., one or more computer processors), may perform calculations and logic operations required to execute a program. A processor-readable storage medium, such as read only memory (ROM) 856 and random access memory (RAM) 858, may be in communication with the processing system 854 and may contain one or more programming instructions for performing the method of implementing a speech scoring engine. Optionally, program instructions may be stored on a computer readable storage medium such as a magnetic disk, optical disk, recordable memory device, flash memory, or other physical storage medium. Computer instructions may also be communicated via a communications signal, or a modulated carrier wave.

A disk controller 860 interfaces one or more optional disk drives to the system bus 852. These disk drives may be external or internal floppy disk drives such as 862, external or internal CD-ROM, CD-R, CD-RW or DVD drives such as 864, or external or internal hard drives 866. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 860, the ROM 856 and/or the RAM 858. Preferably, the processor 854 may access each component as required.

A display interface 868 may permit information from the bus 856 to be displayed on a display 870 in audio, graphic, or alphanumeric format. Communication with external devices may optionally occur using various communication ports 872.

In addition to the standard computer-type components, the hardware may also include data input devices, such as a keyboard 872, or other input device 874, such as a microphone, remote control, pointer, mouse and/or joystick.

As additional examples, for example, the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method of scoring non-native, spontaneous speech, comprising:
   receiving a spontaneous speech sample, wherein the sample is of spontaneous speech spoken by a non-native speaker;
   performing automatic speech recognition on the sample using an automatic speech recognition system to generate a transcript of the spontaneous speech sample;
   determining an internal speech recognizer metric with the automatic speech recognition system, the internal speech recognizer metric being based on a quality measure of an aspect of the automatic speech recognition in the form of one or more confidence scores;
   determining a speech recognizer output metric with the automatic speech recognition system, the speech recognizer output metric including measurements based on timing characteristics corresponding to hypothesized words in the generated transcript;
   determining, using a classifier built on a multiple regression model or a support vector machine model, a word accuracy rate estimate for the transcript generated by the automatic speech recognition system, wherein features of the multiple regression model or the support vector machine model include the speech recognizer output metric and the internal speech recognizer metric;
   determining a proficiency of the spontaneous speech using a preferred scoring model of an automated speech scoring system when the word accuracy rate estimate satisfies a threshold; and
   determining the proficiency of the spontaneous speech using an alternate scoring model of the automated speech scoring system when the word accuracy rate estimate fails to satisfy the threshold.

2. The method of claim 1, wherein the internal speech recognizer metric is selected from the group consisting of a mean normalized confidence score, a proportion of low confidence scores, and a confidence score per second.

3. The method of claim 1, wherein determining the word accuracy rate estimate is further based on an acoustic metric measuring acoustic characteristics of the spontaneous speech sample, wherein the acoustic metric is based on pitch, power, or signal to noise ratio of the speech sample.

4. The method of claim 1, wherein the speech recognizer output metric is based on a speaking rate, silence related metrics, a mean long silence duration, a standard deviation of long silence duration, silences per second, a disfluency related metric, or a frequency of disfluencies.

5. The method of claim 1, wherein the preferred scoring model requires higher speech recognition accuracy than the alternate scoring model.

6. The method of claim 1, wherein human raters are used to score the spontaneous speech sample using the alternate scoring model.

7. The method of claim 1, wherein the alternate scoring model scores the spontaneous speech sample based on fewer metrics than the preferred scoring model.

8. The computer-implemented method of claim 1, wherein
   the internal speech recognizer metric is based on a mean acoustic model score, a mean normalized confidence score, a proportion of low confidence scores, and a confidence score per second, and
   the speech recognizer output metric is based on words per second, a mean long silence duration, a standard deviation of long silence duration, silences per second, a frequency of disfluency, a function word frequency, and a function word proportion.

9. The computer-implemented method of claim 8, wherein
   the preferred scoring model determines the proficiency based on content-related metrics including a vocabulary diversity of the spontaneous speech, grammatical complexity and correctness of the spontaneous speech, and topical coherence of the spontaneous speech, and
   the alternate scoring model determines the proficiency based on only non-content-related metrics.

10. A computer-implemented system scoring non-native, spontaneous speech, comprising:
    one or more data processors; and
    a memory comprising instructions which when executed cause the one or more data processors to execute steps comprising:
       receiving a spontaneous speech sample, wherein the sample is of spontaneous speech spoken by a non-native speaker;
       performing automatic speech recognition on the sample to generate a transcript of the spontaneous speech sample;
       determining an internal speech recognizer metric with the automatic speech recognition system, the internal speech recognizer metric being based on a quality measure of an aspect of the automatic speech recognition in the form of one or more confidence scores;
       determining a speech recognizer output metric with the automatic speech recognition system, the speech recognizer output metric including measurements based on timing characteristics corresponding to hypothesized words in the generated transcript;
       determining, using a classifier built on a multiple regression model or a support vector machine model, a word accuracy rate estimate for the transcript, wherein features of the multiple regression model or the support vector machine model include the speech recognizer output metric and the internal speech recognizer metric;
       determining a proficiency of the spontaneous speech using a preferred scoring model of an automated speech scoring system when the word accuracy rate estimate satisfies a threshold; and
       determining the proficiency of the spontaneous speech using an alternate scoring model of the automated speech scoring system when the word accuracy rate estimate fails to satisfy the threshold.

11. The system of claim 10, wherein determining the word accuracy rate estimate is further based on an acoustic metric measuring acoustic characteristics of the spontaneous speech sample, wherein the acoustic metric is based on pitch, power or signal to noise ratio of the speech sample.

12. The system of claim 10, wherein the preferred scoring model requires higher speech recognition accuracy than the alternate scoring model.

13. The system of claim 10, wherein human raters are used to score the spontaneous speech sample using the alternate scoring model.

14. The system of claim 10, wherein the alternate scoring model scores the spontaneous speech sample based on fewer metrics than the preferred scoring model.

15. The computer-implemented system of claim 10, wherein
the internal speech recognizer metric is based on a mean acoustic model score, a mean normalized confidence score, a proportion of low confidence scores, and a confidence score per second, and
the speech recognizer output metric is based on words per second, a mean long silence duration, a standard deviation of long silence duration, silences per second, a frequency of disfluency, a function word frequency, and a function word proportion.

16. The computer-implemented system of claim 15, wherein
the preferred scoring model determines the proficiency based on content-related metrics including a vocabulary diversity of the spontaneous speech, grammatical complexity and correctness of the spontaneous speech, and topical coherence of the spontaneous speech, and
the alternate scoring model determines the proficiency based on only non-content-related metrics.

17. A non-transitory computer-readable medium encoded with instructions for scoring non-native, spontaneous speech, the instructions being configured to cause a computer processing system to execute steps comprising:
receiving a spontaneous speech sample, wherein the sample is of spontaneous speech spoken by a non-native speaker;
performing automatic speech recognition on the sample to generate a transcript of the spontaneous speech sample;
determining an internal speech recognizer metric with the automatic speech recognition system, the internal speech recognizer metric being based on a quality measure of an aspect of the automatic speech recognition in the form of one or more confidence scores;
determining a speech recognizer output metric with the automatic speech recognition system, the speech recognizer output metric including measurements based on timing characteristics corresponding to hypothesized words in the generated transcript;
determining, using a classifier built on a multiple regression model or a support vector machine model, a word accuracy rate estimate for the transcript, wherein features of the multiple regression model or the support vector machine model include the speech recognizer output metric and the internal speech recognizer metric;
determining a proficiency of the spontaneous speech using a preferred scoring model of an automated speech scoring system when the word accuracy rate estimate satisfies a threshold; and
determining the proficiency of the spontaneous speech the spontaneous speech sample using an alternate scoring model of the automated speech scoring system when the word accuracy rate estimate fails to satisfy the threshold.

18. The non-transitory computer-readable medium of claim 17, wherein
the internal speech recognizer metric is based on a mean acoustic model score, a mean normalized confidence score, a proportion of low confidence scores, and a confidence score per second, and
the speech recognizer output metric is based on words per second, a mean long silence duration, a standard deviation of long silence duration, silences per second, a frequency of disfluency, a function word frequency, and a function word proportion.

19. The non-transitory computer-readable medium of claim 18, wherein
the preferred scoring model determines the proficiency based on content-related metrics including a vocabulary diversity of the spontaneous speech, grammatical complexity and correctness of the spontaneous speech, and topical coherence of the spontaneous speech, and
the alternate scoring model determines the proficiency based on only non-content-related metrics.

* * * * *